United States Patent [19]

French

[11] Patent Number: 4,575,326

[45] Date of Patent: Mar. 11, 1986

[54] APPARATUS FOR CALIBRATING EXTRUDED MATERIAL

[75] Inventor: Terry M. French, Cressona, Pa.

[73] Assignee: Tamaqua Cable Products Corporation, Schuylkill Haven, Pa.

[21] Appl. No.: 679,561

[22] Filed: Dec. 7, 1984

Related U.S. Application Data

[62] Division of Ser. No. 548,503, Nov. 3, 1983, Pat. No. 4,508,500.

[51] Int. Cl.[4] ............................................. B29C 47/90
[52] U.S. Cl. ........................................ 425/71; 425/388
[58] Field of Search ........................... 425/113, 67–71, 425/378 R, 392, 388, 387.1; 118/69; 165/181, 182; 134/122 R

[56] References Cited

U.S. PATENT DOCUMENTS

| | | | |
|---|---|---|---|
| 689,590 | 12/1901 | Johnson et al. | 29/113 R |
| 1,966,785 | 7/1934 | Boucher | 165/181 |
| 2,763,276 | 9/1956 | Cummings | 118/69 |
| 2,956,305 | 10/1960 | Raydt et al. | 425/113 |
| 3,015,133 | 1/1962 | Nichols | 425/71 |
| 3,169,272 | 2/1965 | Maxon | 425/378 |
| 3,187,383 | 6/1965 | Bacchus et al. | 425/67 |
| 3,223,153 | 12/1965 | Simpelaar | 165/181 |
| 3,225,385 | 12/1965 | Kleine | 425/113 |
| 3,538,210 | 11/1970 | Gatto | 425/71 |
| 3,541,189 | 11/1970 | Yoshikawa et al. | 425/71 |
| 3,804,159 | 4/1974 | Searight et al. | 165/181 |
| 3,893,465 | 7/1975 | Cheatwood | 134/122 R |
| 3,931,379 | 1/1976 | Cruson et al. | 425/71 |
| 3,936,519 | 2/1976 | Crystal | 425/113 |

Primary Examiner—Willard E. Hoag
Attorney, Agent, or Firm—Woodcock, Washburn, Kurtz, Mackiewicz & Norris

[57] ABSTRACT

A differential pressure calibrating tank for sizing and cooling just-extruded duct having electrical cable extending through it includes a duct inlet opening and a calibrator head adjacent to that opening for sizing the just-extruded duct. Differential pressure across the walls of the duct tends to keep the duct in a round cross-sectional shape. Flexible conduit in the duct and fixed relative to an adjacent extrusion die but movable in the tank precludes contact between the duct and cable within it while the duct is still molten. The flexible conduit precludes sticking or adherence between the insulation of the electrical conductors and the duct inner walls. In addition, an improved means is provided for restraining the duct submersed in the water as it traverses through the differential pressure calibrating tank. The means for restraining the duct includes, in part, a perforated tube situated within the tank having an inverted V-shaped channel traversing the length of the tube. Buoyant forces acting on the duct in combination with the V-shaped channel tend to keep the duct in a particularly desirable round cross-sectional configuration.

7 Claims, 6 Drawing Figures

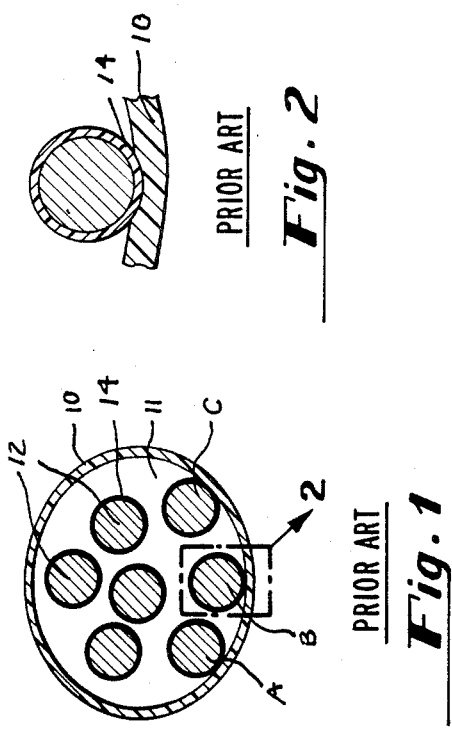
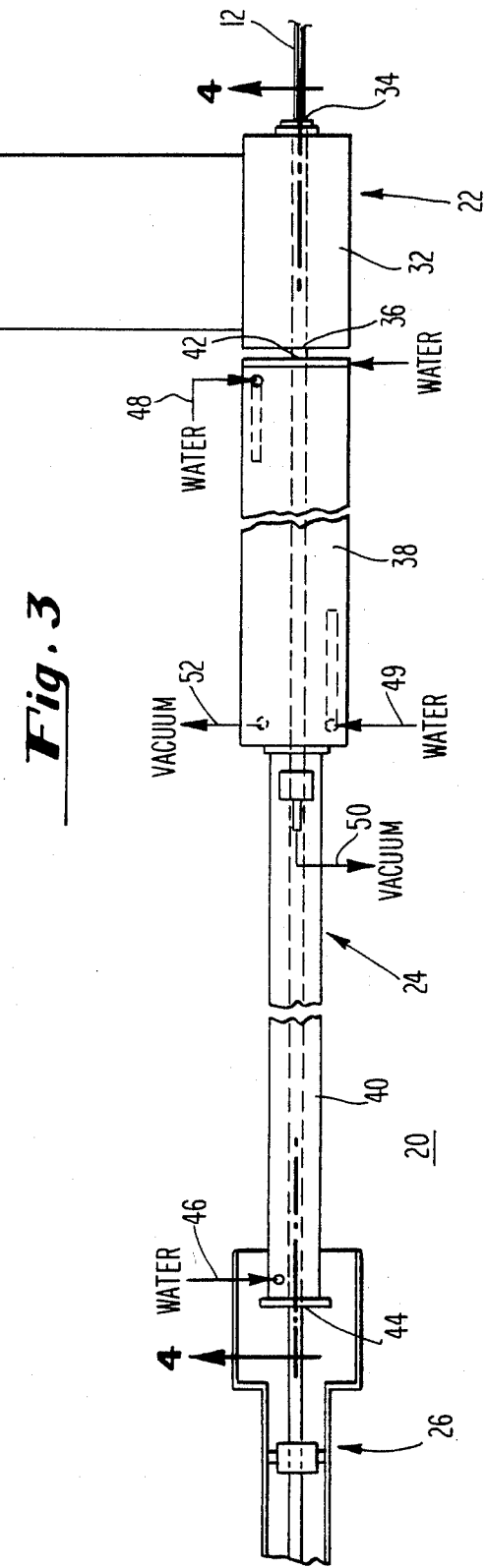

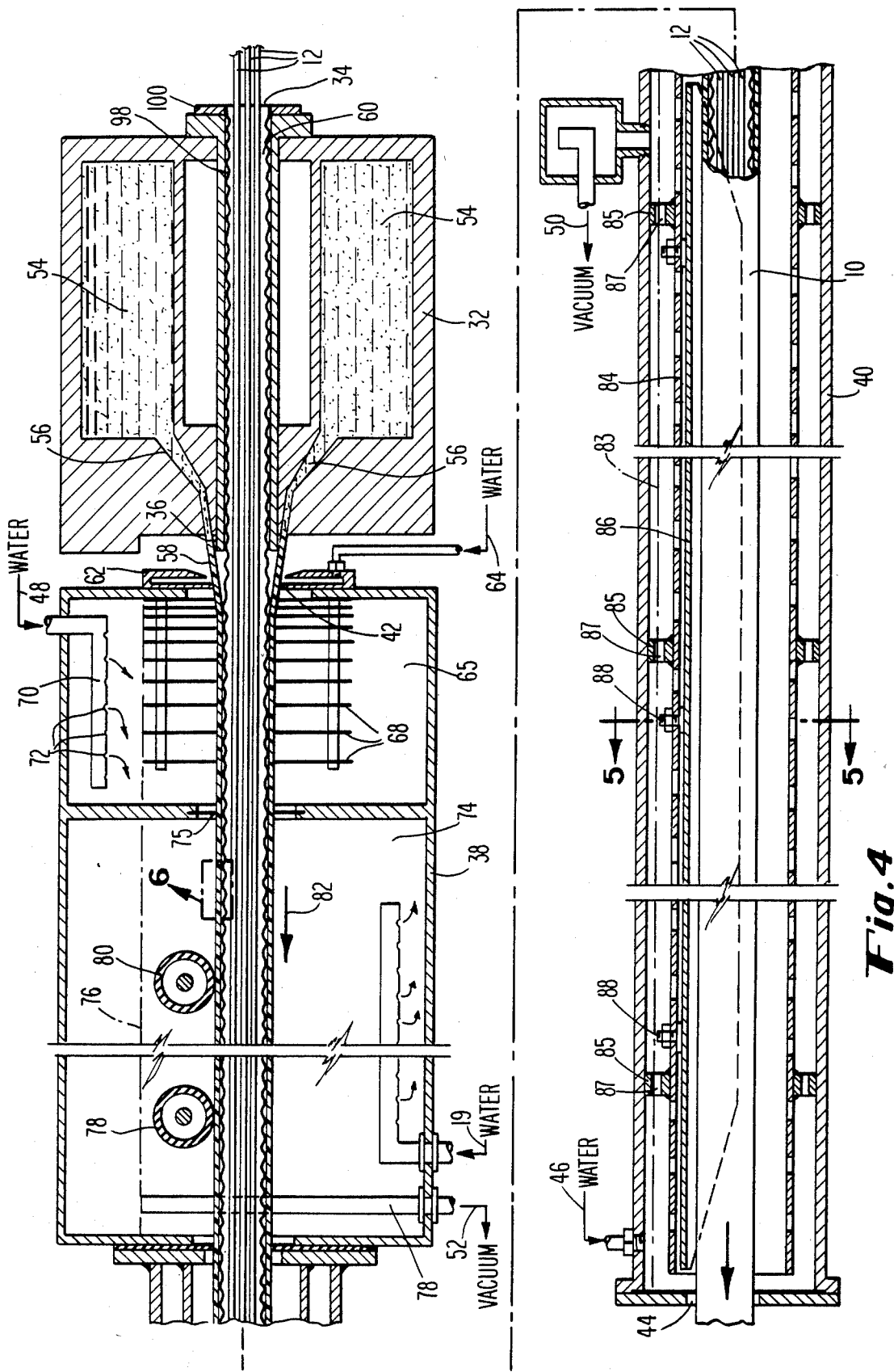

APPARATUS FOR CALIBRATING EXTRUDED MATERIAL

This is a division of application Ser. No. 548,503, filed Nov. 3, 1983, now U.S. Pat. No. 4,508,500, issued Apr. 2, 1985.

FIELD OF THE INVENTION

The present invention relates to the extrusion of non-metallic, flexible ducts around electrical cables or conductors or of empty duct which may incorporate a pulling cord and, in particular, relates to an improved method and apparatus for accomplishing such extrusion.

BACKGROUND OF THE INVENTION

Electrical conductors having extruded insulating coatings thereon are well known. It is also well known to form electrical cables comprised of a number of individual electrical conductors, each of which has an insulating coating on it. Such cables are formed by helically laying or twisting individual conductors to form the final integral cable. Alternatively, cables comprised of parallel laid single conductors are known. For many applications it is desirable to encase the completed cable in a duct or pipe. It is possible that the duct which surrounds the cable may be formed from an extrudable material of the same general type as is used for the insulating coatings of the various individual conductors. It is also desirable to extrude the duct around the cable as the cable is moving or conveyed through the extrusion die which forms the duct.

One particular use to which cables encased in ducts are put is in underground electrical installations. In such installations, a trench is typically dug and the duct having the cable traversing therethrough is placed in the trench. Thereafter, the trench is covered with earth and the cable and duct are buried. Because the nature of various electrical installations may vary from time to time, and further because of problems or difficulties which may be encountered with respect to various conductors of the cable, or with the cable itself, repair or replacement of underground cables may become necessary.

It is obviously expensive and undesirable to reexcavate the trench in which the cable has been laid. Accordingly, it is highly desirable to provide a cable with a surrounding duct which can be moved relative to the duct such that the cable can be removed from the underground installation while leaving the duct buried in place. In this manner, new cable may thereafter be inserted into the duct without the need for expensive reexcavation.

One particular problem which has been recognized with prior art cables which have been placed in ducts is that the cable sticks or adheres to the duct such that after being placed in an underground installation, the cable may not be moved relative to the duct. It is postulated that the cause of the adherence or sticking between the cable and the duct is that during the extrusion of the duct, the insulating coating of the individual conductors making up the cable contacts with and adheres to the duct before the duct has cooled from the temperatures experienced during the extrusion process. As the duct is being extruded, it is in a molten state. After the duct has fully cooled from the temperatures which it experiences during extrusion, it is possible for the insulating coating of the individual conductors to contact the duct without adhering. Before such cooling has taken place, however, contact between the insulating coating of the conductors and the duct tends to cause adherence. Contact between the cable and the duct while the duct is molten may also cause the duct to deform in localized areas. For example, contact between the cable and the duct while the duct is molten may cause depressions or points of weakness in the duct walls which is undesirable.

Various techniques have been proposed or employed for eliminating adherence between electrical cables and the surrounding duct immediately following the extrusion of the duct and while the duct is still vulnerable. In the predominant approach, the extrusion process is simply operated relatively slowly such that the duct is hardened or cooled at a position more closely adjacent to the extrusion die. Thus, when downstream contact between the cable and the duct occurs adherence is avoided. Obviously, however, the operation of a production line at low speed is highly undesirable from an economic standpoint. Accordingly, efforts have been made to eliminate sticking by techniques other than slow speed operation. One such technique has been an attempt to apply talc to the interior of the just-extruded duct. The application of talc, however, tends to be intermittent or subject to removal by scraping. The presence of the talc precludes adherence between the cable insulation and the duct where it is present. However, because of intermittent coating of the talc, sticking still tends to occur between the cable insulation and the duct, thereby precluding relative movement of the cable and the duct which is highly undesirable in underground applications.

In another approach, cooled or refrigerated air or gas has been injected into the interior of the just-extruded duct in an attempt to cool the duct before contact can occur between the cable and the duct's inner wall. It is believed, however, that sticking problems still persist with this approach.

Still another technique which has been employed has been to coat the cable insulation with silicone. However, the primary material utilized for both the cable insulation and the duct is polyethylene. Silicone can react with the polyethylene insulation and with the duct thus causing deleterious effects to both.

Still another approach which the present applicant has employed has been to apply a polyethylene terephthalate barrier tape between the cable and the just-extruded duct in an attempt to preclude adherence between the two. This barrier tape, however, adds to the overall cost of the final product and is not fully satisfactory in precluding sticking or adherence between the conductor insulation and the duct wall. This is especially true at the time at which it is desired to remove the cable from the duct in an underground installation. In such an installation, the polyethylene terephthalate barrier tape tends to buckle, making removal of the cable from the duct particularly difficult.

In addition to the ineffectiveness of the foregoing approaches, all typically require relatively slow speed operation to provide sufficient time for the duct to cool before it comes in contact with the cable present within it. It would be particularly desirable to provide a method and apparatus for precluding adherence between duct and cable which does not require relatively slow operating speeds.

Another troubling problem which arises in the manufacture of electrical cable in a flexible duct in addition to the adherence and deformation problems mentioned above, is the fact that the duct, due to processing conditions, typically deviates from a particularly desirable round, cross-sectional shape. Keeping the duct in a round condition is important, not only for aesthetic purposes, but more importantly because fittings and connections which mate to the duct have a round configuration. If the duct is extruded and, in the course of further processing, is caused to be out-of-round, the duct and the fittings no longer properly mate.

It would be particularly desirable to provide an improved manufacturing process and apparatus which precludes or at least minimizes the instances in which cable is produced in an out-of-round condition. Moreover, it would be desirable to produce a duct which is consistently round in cross-section, to produce the duct at high speeds and to provide a duct which does not stick or adhere to the cables encased within it. It would be further desirable to produce a duct, the walls of which are not easily deformed by the cable during manufacture.

It is an object of the present invention to provide an improved apparatus for the production of extruded duct having a cable extending therethrough which does not suffer from the aforementioned disadvantages.

SUMMARY OF THE INVENTION

Typical apparatus utilized in the past for producing extruded duct having cable therein has included apparatus known as a differential pressure calibrating tank. The present invention provides an improved differential pressure calibrating tank for sizing and cooling just-extruded duct having cable extending through it which has significantly improved operating speeds when compared to the apparatus known to the prior art and which also avoids the sticking and out-of-round problems mentioned above. The improved differential pressure calibrating tank of the present invention includes a duct inlet opening for receiving just-extruded duct from an adjacent extrusion die. A calibrator head adjacent to the inlet opening is provided for sizing the just-extruded duct. The tank includes a cooling water inlet for receiving cooling water which partially fills the tank and submerses the just-extruded duct. A vacuum source is also provided to the tank for creating a differential pressure across the walls of the duct. The interior of the duct is maintained at atmospheric pressure while the exterior of the duct is maintained at less than atmospheric pressure by the vacuum source. The pressure differential across the walls of the duct tends to keep the duct in a round condition as it cools. The improved differential pressure calibrating tank of the present invention further includes a novel means for restraining the duct submersed in the water as the duct travels from the duct inlet to the exit of the tank.

In accordance with an important aspect of the present invention, the means for restraining the duct submersed in the water as it travels from the duct inlet to the duct exit further comprises an elongated, perforated tube. The duct, as it travels through the tank, passes through the center of the tube. The perforations in the tube permit the passage of water which facilitates the cooling of the duct during its formation. In accordance with a still further important aspect of the present invention, situated within the perforated tube is a channel having an inverted V-shape, the apex of the V being situated at the top of the perforated tube. The aforementioned V-shaped channel, in addition to restraining the duct submersed in the water, along with the buoyant forces acting on the duct, tends to maintain the duct in a particularly desirable round, cross-sectional configuration.

In addition and in accordance with the most important aspect of the present invention, contact between the duct walls and the insulating coating of the cables traveling within it is precluded while the duct is in a molten or semi-molten state by means of a flexible conduit situated within the duct and between the duct and the cable. The flexible conduit is fixed relative to the extrusion die but movable with respect to the tank. In the preferred embodiment of the present invention, the flexible conduit is a corrugated metal tube. The flexibility of the conduit is important because buoyant forces acting upon the duct as it travels through the cooling water tend to cause the duct to rise which in turn causes the conduit to flex or bend. Because of the presence of the flexible conduit, sticking problems are avoided even at very high operating speeds.

In accordance with still another aspect of the present invention, the cooling water to the differential pressure calibrating tank enters the tank at a position adjacent the duct exit and is induced to flow in the direction opposite to the path of travel of the duct. In this manner, heat is removed from the just-extruded duct in a very efficient fashion, thereby permitting high speed operation.

BRIEF DESCRIPTION OF THE DRAWINGS

The present invention will be more fully understood by reference to the accompanying drawings, in which:

FIG. 1 is a cross-sectional view of duct manufactured in accordance with the prior art and having conductors traversing therethrough, each of which has an insulating coating;

FIG. 2 is an enlarged cross-sectional view of a single such conductor and a portion of the duct wall shown in FIG. 1;

FIG. 3 is a plan view of the improved system for manufacturing the duct of FIG. 1 including the improved differential pressure calibrating tank of the present invention;

FIG. 4 is a vertical section view of the differential pressure calibrating tank of FIG. 3 taken along section lines 4—4 thereof;

DETAILED DESCRIPTION OF THE PREFERRED EMBODIMENT

Figure 5:
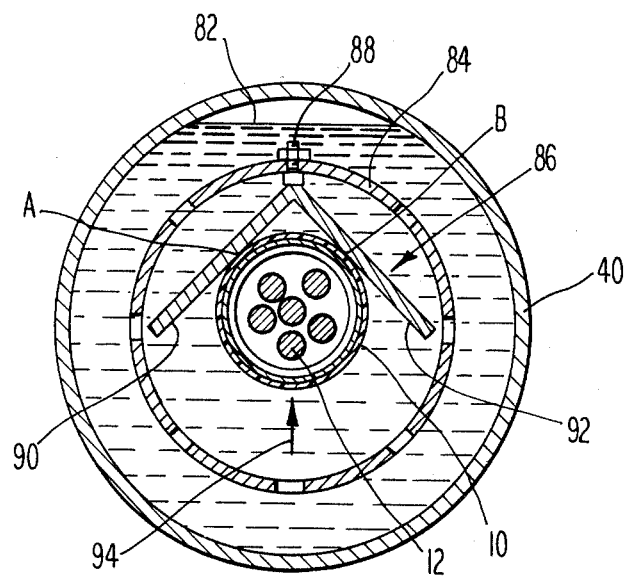
FIG. 5 is a cross-sectional view of the tank shown in FIG. 4 taken along section lines 5—5.

Referring first to FIG. 1, the product made in accordance with the prior art and having the disadvantages of the prior art referred to above will be seen. As shown in FIG. 1, an extruded duct 10 will be seen. The duct 10 has an inner cavity or bore 11. Traversing through the bore 11 of the duct 10 are a plurality of electrical conductors 12, each of which has an insulating coating 14 thereon. As shown in FIG. 1, the duct 10 carries a cable comprised of seven conductors 12. In practice, however, the number of individual conductors 12 which make up the cable may vary. In fact, the present invention finds utility in the manufacture of even empty duct. For underground installations it is desirable that the combined cross-sectional area of all of the conductors 12 be substantially less than the cross-sectional area of the duct 10 so as to permit easy removal of the cable from the duct 10 after the duct has been installed in an underground installation. As shown in FIG. 1, the cross-sectional shape of the duct 10 is somewhat elliptical. It would be desirable to provide duct 10 with a uniformly round, cross-sectional shape. Moreover, as shown in FIG. 1, certain of the conductors 12, namely conductors marked A, B and C are in contact with the inner wall of the duct 10.

As shown in FIG. 2, contact between the insulating coating 14 surrounding the electrical conductor 13 and the duct wall 10 may cause a localized deformation of the wall 10. This localized deformation may cause thinning of the duct wall and therefore points of weakness in the duct wall which are undesirable. Moreover, when the duct 10 is formed of generally the same material as the insulating coating 14, such as, for example, melt extrudable polyethylene, the insulating coating 14 and the duct wall may bond together, either mechanically or chemically, so as to cause the sticking or adherence problem referred to above. The present invention is directed to an improved apparatus for forming the product of FIG. 1 which does not suffer from the out-of-round condition depicted in FIG. 1, and which does not suffer from the localized deformation and adherence depicted in FIG. 2.

The present invention will be more fully understood by reference to FIG. 3 in which an improved system for forming the product of FIG. 1 is shown generally at 20. The system 20 preferably includes three main components. The first of these components is an extruder shown generally at 22 for extruding the duct 10. The second of these components comprises a differential pressure calibrating tank 24 for sizing and cooling the just-extruded duct and a cooling trough 26 for further and final cooling of the duct after it traverses the differential pressure calibrating tank 24.

In accordance with the preferred embodiment of the present invention, the extruder 22 preferably comprises a resin hopper 28 for receiving resin pellets, for example, of polyethylene. The extruder 22 preferably includes a feed screw mechanism 30 for heating and conveying the pellets and for directing extrudable material to an extrusion die chamber 32. The extrusion die chamber 32 preferably includes an input opening 34 to which individual electrical conductors 12 are directed. The extrusion die chamber 32 also includes a die orifice 36 from which just-extruded duct emerges with the conductors 12 encased within it.

The just-extruded duct from the extrusion chamber 32 as well as the conductors 12 move from right to left as shown in FIG. 3 and are directed to the differential pressure calibrating tank 24 of the present invention. The differential pressure calibrating tank 24 preferably includes a first portion 38 and a second portion 40. The first portion 38 of the differential pressure calibrating tank 24 is of a type known to the prior art and sold by Gatto Manufacturing Company and typically referred to as a Gatto box. The second portion 40 of the differential pressure calibrating tank 24 of the present invention is an extension of the first portion 38 and preferably is in the form of a cylindrical outer shell. Both the first and second portions 38 and 40 of the tank 24 will be described in connection with FIG. 4 below. The differential pressure calibrating tank 24 of the present invention also includes a duct inlet 42 which opens to the tank and receives the just-extruded duct from the adjacent extrusion die chamber 32. The tank also includes a duct exit 44 from which sized and cooled duct passes on its way to the cooling trough 26. The differential pressure calibrating tank 24 includes a plurality of cooling water inlets 46, 48 and 49. It further includes two vacuum sources 50 and 52. Since the interior of the duct contains air at atmospheric pressure, the vacuum sources 50 and 52 create a differential pressure across the walls of the duct 10 as it traverses through the differential pressure calibrating tank 24. As will be more fully explained below, the cooling water from the cooling water inlets 46, 48 and 49 partially fills the tank so as to fully submerse and cool the just-extruded duct.

The cooling trough 26 partially shown in FIG. 3, is of a type well known to the art. The trough 26 contains a source of cooling water such that additional heat may be carried away from the duct 10 after it emerges from the differential pressure calibrating tank 24.

Referring now to FIG. 4, the extrusion die chamber 32 as well as the differential pressure calibrating tank 24 will be described in further detail. As will be seen from FIG. 4, the extrusion die chamber 32 comprises an annular compartment 54 containing molten resin fed thereto by the feed screw 30. Molten resin from the annular compartment 54 is directed to an annular die orifice 36 through a throat region 56 under pressure. Exiting from the die orifice 36 is a cone of molten resin 58 which, when sized and cooled, is solidified to form the duct 10. Traversing along the longitudinal axis of the cone of molten resin 58 are the electrical conductors 12 which will be situated within the bore 11 of the finished duct 10. The electrical conductors 12 are inserted through the central bore 60 of the extrusion die chamber 32 and enter the bore 60 at the input opening 34 to that chamber.

As shown in FIG. 4, the first portion 38 of the tank 24 is divided into a first chamber 65 and a second chamber 74. These chambers 65 and 74 are separated by a seal or gasket 75. The cone 58 of molten resin enters the first chamber 65 of the differential pressure calibrating tank 24 at the inlet opening 42. As the just-extruded duct enters the inlet opening 42, it is initially cooled by a jet of cooling water directed thereto by means of a cooling water manifold 62. Water is directed to the cooling water manifold 62 by means of a cooling water line 64. Situated within the first chamber 65 of the differential pressure calibrating tank 24 and adjacent to the inlet opening 42 thereof is a calibrator head comprised of a plurality of spaced annular calibrator rings 68 for sizing the just-extruded duct as it enters the tank 24. Cooling water from the cooling water inlet 48 is directed to the first chamber 65 through a pipe 70 having apertures 72 therein. The cooling water from the apertures 72 is directed to the exterior walls of the duct 10 as it traverses through the calibrator head. Situated downstream from the first chamber 65 of the first portion 38 of the tank 24 is a second chamber 74. Cooling water enters the second chamber 74 from the water inlet 49. The cooling water in the chamber 74 reaches the level shown at 76 which is above the path taken by the just-extruded duct 10 as it passes through the tank. Water is maintained at the level 76 by virtue of the fact that the standpipe 78 is connected to a vacuum source 52, as shown.

The second chamber 74 of the tank 24 includes a means for restraining the duct 10 in a submerged position beneath the water level 76 as it traverses through the tank which includes a pair of inflatable and deformable rollers 78 and 80 which rotate about an axis transverse to the direction of travel of the duct 10 (as shown by arrow 82) as the duct traverses the tank 24 between the inlet and exit openings. It has been found that the use of inflatable and deformable rollers 78 and 80 tends to preclude distortion of the duct 10 and thereby avoid the elliptical cross-sectional shape of the prior art duct shown in FIG. 1.

The second portion 40 of the differential pressure calibrating tank 24 preferably comprises a cylindrical housing. The duct 10 preferably travels along the longitudinal axis thereof to the duct exit opening 44. Cooling water enters the cylindrical housing 40 at the cooling water inlet 46 which is adjacent to the exit opening 44. A vacuum source 50 is located at the remote end of the cylindrical housing 40. Since the location of the cooling water inlet 46 and the vacuum source 50 are at opposite ends of the cylindrical housing 40, cooling water is induced to flow in a direction opposite to the direction of travel of the duct 10 as it traverses through the tank 24 which aids in the cooling of the duct and the solidification thereof from its molten state. The cooling water which enters the cylindrical chamber 40 substantially fills that chamber to the water level as shown at 83.

In accordance with an important aspect of the present invention, the cylindrical housing 40 also includes a means for restraining the duct 10 in a position below the water level 82. This means preferably includes an elongated tube 84, preferably concentric with the longitudinal axis of the cylindrical housing 40. The longitudinal axis of the tube 84 is thus generally parallel to the path of travel of the duct 10 through the tank 24. The tube 84 includes perforations 86 throughout the periphery thereof so as to permit the free passage of cooling water into the interior. The provision of the perforated tube 84 tends to keep the duct 10 completely submerged as it passes through the second portion 40 of the differential pressure calibrating tank 24. This is true despite the fact that buoyant forces acting upon the duct 10 tend to cause the duct to rise. But for the presence of the perforated tube 84, the duct 10 would tend to rise above the water level 82. It has been found that when the duct rises above the water level 82, it tends to assume an out-of-round condition, which as mentioned above, is highly undesirable.

The perforated tube 84 is supported within the cylindrical shell 40 by means of a plurality of radially extending baffles 85. Each of the baffles 85 include a plurality of longitudinally extending apertures 87 which permit the flow of cooling water along the length of the perforated tube 84 from the water inlet 46 toward the vacuum source 50.

In accordance with another important aspect of the present invention, situated within the perforated tube 84 a further means for restraining the duct in a submerged position will be seen. This means includes a channel member 86 running substantially along the length of the perforated tube 84. The channel member 86 may best be seen in cross-section by reference to FIG. 5.

As shown in FIG. 5, the channel 86 is preferably an inverted V-shape in cross-section. The apex of the channel is oriented upwardly and is attached to the perforated tube 84 by means of bolts or other fasteners 88, as shown. It has been found that the provision of the inverted V-shape channel member 86 tends to greatly reduce frictional forces caused by the movement of the duct 10 through the chamber 40 for the reason that contact between the duct 10 and the side walls 90 and 92 of the channel is confined to contact at only two points (A and B of FIG. 5) throughout the length of the channel 86. Moreover, it is believed that the buoyant force acting upon the duct 10 and shown by the vector 94 in FIG. 5 tends to force the duct 10 upwardly into the crevice of the inverted V-shaped channel 86 thereby tending to keep the duct walls in a particularly desirable round configuration which avoids the elliptical cross-sectional shape of the duct shown in FIG. 1.

Referring again to FIG. 4, and also to FIG. 6, another important aspect of the present invention will be described which is believed to be the largest single contributor to the surprising increase in operating speeds achieved with the present invention and to the production of duct which does not suffer from the problems of sticking or adherence referred to above. As shown in FIG. 4, a means is provided which precludes contact between the conductors 12 and the just-extruded duct 10, while the walls of the duct 10 are molten or semi-molten. This means comprises a flexible metal conduit 98. The flexible metal conduit 98 is inserted in the bore 60 of the extrusion die chamber 32 and runs the entire length of that chamber and into and through substantially the entire length of both the first and second portions 38 and 40 of the differential pressure calibrating tank 24. Conductors 12 move through the center of the conduit 98 from right to left as shown in FIG. 4. The conduit 98, however, does not move in the same fashion, nor does it become part of the finished duct 10.

The flexible metal conduit 98 is fixed relative to the extrusion die chamber 32 by means of a flange 100 situated adjacent the input opening 34 thereof. The conduit 98 is made flexible by virtue of the fact that it is corrugated, as best seen in FIG. 6. Because the conduit 98 is flexible, it is movable with respect to the tank 24. This is an important feature because as the just-extruded duct 10 travels through the differential pressure calibrating tank 24, it tends to float in the water therein until it contacts one of the restraints mentioned above, such as rollers 78 and 80 or the channel member 86. After contact with these restraints, the duct tends to course relatively downwardly in the water until buoyant forces again tend to cause it to rise. Thus, in addition to the general motion of the duct 10 from right to left as shown in FIG. 4, the duct also tends to move up and down. The flexibility of the conduit 98 thus permits this natural motion of the duct.

Figure 6:
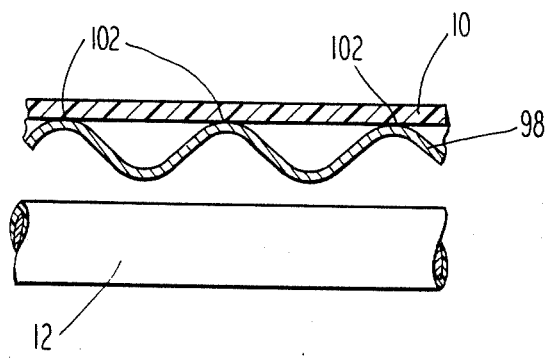
FIG. 6 is an enlarged view of region 6 shown in FIG. 4.

In addition, as best seen from FIG. 6, the corrugations of the flexible conduit 98 also tend to minimize frictional forces created between the conduit 98 and the inner walls of the just-extruded duct 10. This is accomplished because the duct 10 contacts only the peaks 102 of the corrugations and these point contacts are an important aid in reducing friction. It is preferred that the flexible conduit be formed of a metal which is non-corrosive such as copper or aluminum and their alloys, or alternatively of steel.

It has been found by the present applicant that when the teachings of the present invention are practiced, operating speeds, and therefore through-put has been increased from 300 to as much as 1100 percent. Moreover, the duct produced is substantially improved insofar as sticking or adherence between conductors and the duct walls is concerned. Finally, the duct produced is uniformly round in cross-sectional shape.

While a particular embodiment of the present invention has been shown and described it will be appreciated that other embodiments will occur to persons skilled in the art, and, accordingly all such embodiments are within the spirit and scope of the appended claims.

What is claimed is:

1. A differential pressure calibrating tank for sizing and cooling just-extruded duct comprising:
 a duct inlet opening to the tank for receiving just-extruded duct from an adjacent extrusion die;
 a calibrator head adjacent the inlet opening for sizing the just-extruded duct;
 a cooling water inlet to the tank, the cooling water partially filling the tank and submersing the just-extruded duct;
 a vacuum source to the tank for creating a differential pressure across the walls of the duct;
 a duct exit from the tank through which the sized and cooled duct passes; and
 a means for restraining the duct submersed in the water as the duct travels from the duct inlet to the exit, the restraining means including a perforated tube situated within the tank, the longitudinal axis of said tube being generally parallel to the direction of travel of the duct, said duct traversing the perforated tube as it travels, the restraining means further including a channel having a generally inverted V-shape situated within said perforated tube, the apex of said channel being oriented vertically upwardly.

2. The tank of claim 1 wherein a first end of said tube is adjacent said duct exit.

3. The tank of claim 2 wherein said cooling water inlet is situated adjacent the first end of the tube and said vacuum source is situated remote therefrom whereby a flow of cooling water is induced in said tube from said first end in the direction opposite of the direction of travel of said duct.

4. The tank of claim 3 wherein: said tank includes an outer cylindrical shell, said perforated tube being concentric therewith.

5. The tank of claim 4 wherein said perforated tube further comprises at least two radially extending baffles for spacing said tube from said cylindrical shell, said baffles having longitudinally extending apertures to permit the flow of cooling water along substantially the entire length of said perforated tube.

6. The tank of claim 1 wherein said restraining means further comprises:
 at least one roller oriented to rotate about an axis transverse to the path of travel of said duct between the duct inlet and the duct exit, said roller being inflatable and deformable.

7. a differential pressure calibrating tank for sizing and cooling just-extruded duct comprising:
 a duct inlet opening to the tank for receiving just-extruded duct from an adjacent extrusion die;
 a calibrator head adjacent the inlet opening for sizing the just-extruded duct;
 a cooling water inlet to the tank, the cooling water partially filling the tank and submersing the just-extruded duct;
 a vacuum source to the tank for creating a differential pressure across the walls of the duct;
 a duct exit from the tank through which the sized and cooled duct passes; and
 a means for restraining the duct submersed in the water as the duct travels from the duct inlet to the exit, the restraining means including a perforated tube situated within the tank, the longitudinal axis of said tube being generally parallel to the direction of travel of the duct, said duct traversing the perforated tube as it travels, said restaining means further comprising at least one roller oriented to rotate about an axis transverse to the path of travel of said duct between the duct inlet and the duct exit, said roller being inflatable and deformable.

* * * * *